(12) United States Patent
Jorge et al.

(10) Patent No.: US 8,157,984 B2
(45) Date of Patent: Apr. 17, 2012

(54) PROCESS FOR SEWAGE WATER PURIFICATION

(75) Inventors: Miller Jorge, Houston, TX (US); Miller Luisa Kling, Houston, TX (US)

(73) Assignee: Potable Water Systems Ltd., Houston, TX (US)

( * ) Notice: Subject to any disclaimer, the term of this patent is extended or adjusted under 35 U.S.C. 154(b) by 43 days.

(21) Appl. No.: 11/694,306

(22) Filed: Mar. 30, 2007

(65) Prior Publication Data
US 2007/0227904 A1 Oct. 4, 2007

Related U.S. Application Data

(60) Provisional application No. 60/787,907, filed on Mar. 31, 2006, provisional application No. 60/788,278, filed on Mar. 31, 2006.

(51) Int. Cl.
*C02F 1/46* (2006.01)
(52) U.S. Cl. ........ 205/742; 205/747; 205/749; 205/751; 204/275.1; 204/277
(58) Field of Classification Search .................. 205/742, 205/747, 749, 751, 556; 204/275.1, 277
See application file for complete search history.

(56) References Cited

U.S. PATENT DOCUMENTS

| | | | |
|---|---|---|---|
| 3,915,822 A | 10/1975 | Veltman | |
| 3,963,592 A * | 6/1976 | Lindstrom | 205/512 |
| 4,048,030 A | 9/1977 | Miller | |
| 4,119,518 A | 10/1978 | Miller | |
| 4,121,991 A | 10/1978 | Miller et al. | |
| 4,169,035 A | 9/1979 | Stummer et al. | |
| 4,172,774 A | 10/1979 | Moeglich | |
| 4,802,991 A * | 2/1989 | Miller | 210/705 |
| 5,935,448 A | 8/1999 | Miller | |
| 6,177,016 B1 | 1/2001 | Miller et al. | |
| 6,613,217 B1 * | 9/2003 | Gilmore | 205/755 |
| 7,008,523 B2 * | 3/2006 | Herrington | 205/701 |

FOREIGN PATENT DOCUMENTS

| | | |
|---|---|---|
| DE | 25 55 175 A1 | 8/1975 |
| EP | 0141981 A | 5/1985 |
| EP | 1538128 A | 6/2005 |
| WO | WO 93/13021 A | 7/1993 |
| WO | WO 99/41204 | 8/1999 |

* cited by examiner

*Primary Examiner* — Arun S Phasge
(74) *Attorney, Agent, or Firm* — The Juhasz Law Firm, P.C.

(57) ABSTRACT

Process and apparatus to remove colloids and nitrogen compounds from contaminated water by coagulating the colloids and separating them from the water. The water is then continuously oxidized with chlorine electrolytically to destroy the nitrogen compounds.

23 Claims, 5 Drawing Sheets

PROCESS FOR SEWAGE WATER PURIFICATION

CROSS REFERENCE TO RELATED APPLICATIONS

This application claims priority to U.S. Provisional Application Ser. No. 60/787,907, filed on Mar. 31, 2006, and U.S. Provisional Application Ser. No. 60/788,278, filed on Mar. 31, 2006, which is incorporated herein in its entirety.

FIELD OF INVENTION

This invention relates to a process for water purification and to an apparatus for carrying out the process. The invention further relates to the electrolytic chlorination of the purified water.

BACKGROUND OF THE INVENTION

Economical and efficient methods and apparatus for purifying contaminated water, particularly water containing fatty acids, have long been sought. Contaminated water, e.g., waters containing soluble nitrogen compounds, suspended organic colloidal emulsions or suspensions such as effluents from meat processing plants, dairies, cheese processing plants, bakeries, chemical plants, paper plants and petroleum plants and effluents including raw sewage are of particular interest.

The colloids have a negative charge which prevents them from coalescing and makes filtration or separation practically impossible. Previous methods for water purification include combining the fatty acid contaminated water with metallic ions released from electrodes during electrolysis to form hydrophobic, metallic soaps. Bivalent or trivalent metal ions are released from electrodes during electrolysis and combine with the fatty acids to form an insoluble flocculent. The flocculant, in turn, entrains or absorbs other impurities present in the contaminated water. Thus, the flocculant serves as a transport medium to remove not only fatty acids, but also other impurities from the water. In order to ensure continuous production of ions, the electrodes were disposed in a moving bed of solid particles. The solid particles were kept in motion by the flow of process water through the electrolysis chamber in order to continuously abrade and clean the electrode surfaces. The flocculant and entrained impurities were directed to a flocculation/separation basin where the flocculent and entrained impurities were separated by flotation, leaving purified water for withdrawal from the basin.

Electrolytic water treating systems, including electro-flotation and electrocoagulation systems, while functional, have difficulties when their electrodes become covered with an insoluble layer that is not removable by merely changing the polarity of the electrodes. This is especially true when sewage water containing fatty acids is electrolyzed with metal electrodes which form an insoluble metal soap at the surface of the anode which is difficult to remove.

Current electrolytic water treating systems clean the electrodes by a moving bed of hard particles and introduces air before the electrolytic cell to move the bed and the water through the system. However, it has been found that bubbles before the electrolytic cells increase the electrical resistance between the electrodes thereby requiring higher voltages and inducing excess wear on electrodes, walls and parts of the cell.

After the majority of contaminants have been removed, remaining dissolved and suspended contaminating materials need to be removed and have been electrolytically treated with chlorine. Chlorine is normally made electrolytically, continuously introducing a concentrated salt solution (chloride ions) into the anode compartment of an electrolysis cell which is separated from the cathode compartment by a permeable diaphragm. Before the advent of ion exchange diaphragms the diaphragm were made of many plies of asbestos paper between anode and cathode to prevent as much as possible mixing of the caustic produced in the cathode compartment with the chlorine produced in the anode compartment. Currently, cationic ion exchange diaphragms that prevent the flow of anions and of solutions from one compartment to another are typically used.

Chlorine as sodium hypochlorite may be made by electrolyzing salt water without the use of diaphragms. This process is especially useful for swimming pool applications. This process has the disadvantage of using salt and the calcium and magnesium present in the water to form carbonates which deposit on the cathode eventually isolating it and preventing current flow between the electrodes. The cathode must then be cleaned with acid to remove the calcareous coating.

The standard electrolytical technique to chlorinate water in swimming-pools is to provide a separate cell containing a high concentration of common salt which upon electrolysis gives sodium hypochlorite or chlorine which is fed into the swimming-pool. Theoretically, it is possible to add sufficient common salt to the swimming-pool water and to electrolyze it directly. However, this technique has the disadvantage that the water tastes salty to the bathers and that the calcium contained in the water deposits onto the cathodes to such an extent that the flow of the current stops or is impaired. Changing of polarity to remove the calcium deposits on the cathodes has been found in practice to lead to corrosion of the cathode.

The water purification industry has continued to seek new and improved methods for removing fatty acids and other contaminants from water. Accordingly, there has been a long-felt but unfulfilled need for more economical, more efficient and more convenient methods for purifying water, particularly water contaminated with fatty acids and other contaminants and treating the purified for eventual discharge or use.

SUMMARY OF THE INVENTION

An embodiment of the invention describes an apparatus for the purification of contaminated waste having (a) an electrolytic cell, (b) an entry port below the electrolytic cell, (c) an upper section above the electrolytic cell including an air sparger and an outlet, (d) a closed draining space adjacent to the upper section comprising means for separating water and impurities, and (e) a re-circulating pump connecting the outlet to the entry port of the electrolytic cell. The electrodes of the electrolytic cell are preferably connected in series. The apparatus may also include an inclined bottom basin which slopes away from the upper section having a purified water outlet at the lower end of the inclined bottom opposite the upper section, a recirculating outlet located above the purified water outlet, and an exit port located above the recirculating outlet. The re-circulating outlet may be connected to the re-circulating pump. In alternate embodiments, the apparatus may also include a filter such as, but not limited to, a rotary vacuum filter, a filter press, conveyor belt vacuum filter, a sand filter or a centrifuge filter. In some embodiments, the upper section is conical in cross section and the electrodes may be iron, magnesium, aluminum and their alloys. In some embodiments, the polarity of the electrodes is cycled continuously and the frequency of cycling the polarity of the electrodes is between about 1 change per 1 second and about 1 change per 10 minutes. In some embodiments, a chlorinator is also included in the apparatus.

In another embodiment of the invention, a water purification process having the following steps is described: (a) passing contaminated water in a generally vertically upward direction through an electrolytic cell having a plurality of electrodes surrounded by a moving bed of solid, non-conductive particles to form a hydrophobic floc comprising purified water, water, impurities and suds; (b) directing the floc to a closed chamber directly connected to an upper end of the electrolysis chamber; (c) separating the impurities, suds and water from the purified water; (d) recirculating a portion of the water from the closed chamber to the electrolytic cell; (e) removing the impurities and suds from the closed chamber, and (f) removing the purified water from the closed chamber. In some embodiments, air is sparged above the electrolytic cell and the electrodes are connected in series with the polarity of the electrodes being changed continuously. In some embodiments, the upward velocity of the water is partially accomplished by re-circulating the water through the cell and the contaminated water is directed through the moving bed by pressure. The non-conductive particles are preferably granite and have a specific density greater than that of the contaminated water and their free falling velocity is greater than the upward velocity of the water. In some embodiments, the purified water is further chlorinated. In some embodiments, the polarity of the electrodes is being alternated by applying a direct current voltage and the frequency in change of polarity ranges from about 1 change per second to about 1 change per 10 minutes and the change of polarity has the same duration. In some embodiments, additional soap solution is added to the water to be purified and micro bubbles are produced utilizing the change in pressure due to a re-circulation pump.

In another embodiment of the invention, a chlorination system is described as having one or more anodes, a porous diaphragm surrounding the anodes, a cathode surrounding the porous diaphragm, means for directing the flow of fluids towards the anode, and means for preventing the backflow of fluids out of the cell. Preferably, the porous diaphragm is permeable enough to allow laminar flow but tight enough to prevent turbulent flow. In some embodiments, the system also includes a non-conductive separator spaced between the anode and the porous diaphragm and surrounding the anodes. The anode may be made of carbon, titanium covered with platinum, titanium covered with ruthenium oxide, or other non corrodible elements. In some embodiments, the means for directing the flow of fluids towards the anode is a porous diaphragm having a non-permeable bottom and an open top. In some embodiments, the means for preventing the backflow of fluids is a check valve, ball valve, or gate valve.

In another embodiment of the invention, a water chlorination process is described as having the following steps: (a) flowing a water stream in an upward direction into an electrolytic cell comprising an anode compartment and a cathode compartment separated by a porous diaphragm; (b) concentrating chloride ions in the water in the anode compartment via electrodialysis, (c) accumulating hydrochloric acid in the anode compartment. In some embodiments, the process also includes intermittently diffusing the hydrochloric acid from the anode compartment to the cathode compartment through the porous diaphragm.

DETAILED DESCRIPTION OF EMBODIMENTS OF THE INVENTION

Contaminated water is treated electrolytically to produce highly positive compounds using corrodible electrodes to form with high molecular weight organic acids highly positive insoluble hydrophobic soaps which traps organic compounds and encapsulates some microbes. Contaminated water sources include, but are not limited to, water from meat processing plants, dairies, cheese processing plants, bakeries, chemical plants, paper mills, and petroleum plants and effluents including raw sewage.

Figure 1:
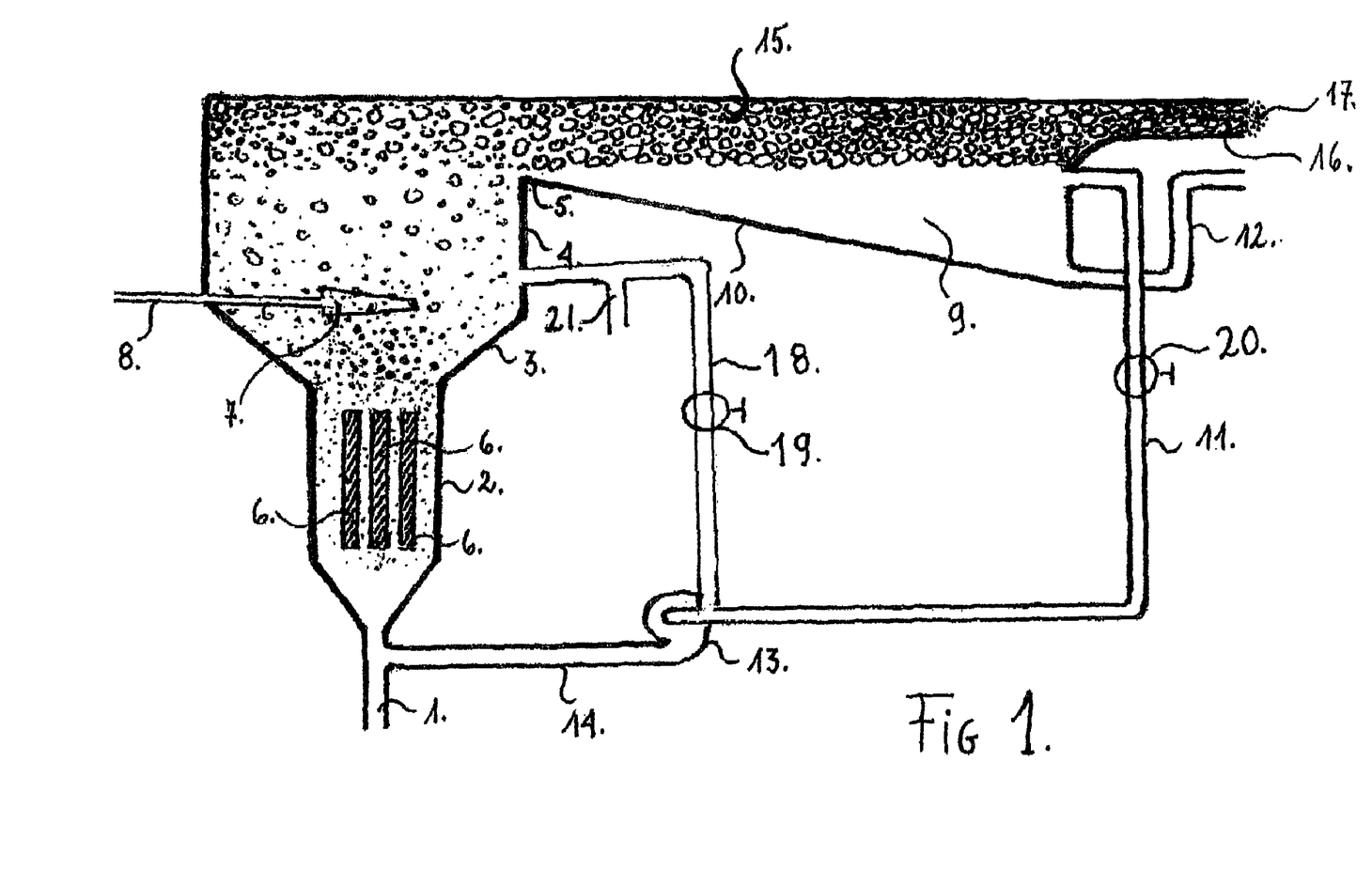
FIG. 1 shows an embodiment of a water purification apparatus and process in accordance with the present invention.

FIG. 1 shows a preferred embodiment of a water purification apparatus. An inlet conduit 1 is connected to the bottom of an electrolytic cell 2. At the top of the electrolytic cell 2 is an upper section 4 having an outlet passage 5. The upper section 4 preferably includes a conical section 3 connected to the top of the electrolytic cell 2 and an outlet conduit 18. The outlet passage 5 is located above the conical section 3. Between the outlet passage 5 and the conical section 3, the outlet conduit 18 exits the upper section. Outlet conduit 18 includes line 21 and is fed to the inlet of a re-circulating pump 13. Air and additional soap may be introduced through line 21 into the system. The upper section 4 is preferably closed to the atmosphere.

Electrodes 6 are mounted in cell 2 in any suitable way (not shown in the drawing) and are connected in series to a direct current source which is changed in polarity continuously. The change in polarity of the current insures the equal corrosion of the end electrodes which are connected in series to the current source but enhances the cleaning action of the fluid bed. The frequency of change in polarity is preferably done at equal periods of time. In some embodiments, continuously, as referred to herein, refers to changing the polarity between about 1 change per 1 second to about 1 change per 10 minutes and is dependent upon the amount of contaminants in the water and the tendency of the contaminants to accumulate on the electrodes.

In some embodiments, the electrodes 6 are preferably corrodible and made of, but not limited to divalent or trivalent metals, such as, aluminum, iron, magnesium or their combination or alloys. The electrodes are connected in series to a direct current source whose polarity is changed during short, preferably, equal periods of time. The electrodes 6 are surrounded by a moving bed of solid non-conductive hard particles whose specific density is greater than that of the contaminated water.

In some embodiments of the invention, located at the top of the conical section 3, above the point where the solid particles have settled, is an air sparger 7. The air sparger 7 supplies additional bubbles besides those formed during electrolysis to the upper section 4. The air sparger 7 may be connected to a compressed air supply 8. The compressed air produces bubbles to float the flocs produced by the release of metallic soaps during the electrolysis of the water to be purified. In some embodiments, the air bubbles are introduced after the electrolytic cell.

Although a conical section 3 is shown, any cross-section may be used and preferably a cross-section which will decrease the upward moving velocity of the water to a value where the solid particles will settle down into the electrolytic cell is used. The solid particles free falling velocity in water should be higher than the upward moving velocity of the water. The flow through the flocculation basin should preferably be maintained to allow any solid particles which are carried away from the bed to return to the electrolysis chamber.

Outlet passage 5 is connected to basin 9. Basin 9 also includes a draining space 15 that may have an inclined bottom 10. A recirculating conduit 11 is near the upper edge of the basin and preferably opposite from the outlet passage 5. The basin 9 is preferably closed to the atmosphere. A purified water outlet 12 is at the bottom of basin 9, also preferably opposite from the outlet passage 5. A suds outlet 16 is located opposite the outlet passage 5, preferably some distance away to allow acceptable separation of the floc and the purified water. Recirculating conduit 11, along with outlet conduit 18, is fed to re-circulating pump 13 whose outlet 14 may be connected to the inlet conduit 1 below the electrolytic cell 2. Basin 9 also includes a suds outlet 16 which is located above the draining space 15. The location of the recirculating conduit 11 is preferably located near or below the layer of bubbles in order to catch any settling floc and recycling it to the electrolytic cell. This insures that all floc preferably exits through the suds outlet 16.

Both upper section 4 and basin 9 are preferably closed to the atmosphere. In practice, it has been found that exposure to the atmosphere dries out and bursts the bubbles and the flocs tend to settle, making it difficult to obtain a pure water free of flocs. The closed environment protects the bubbles carrying the flocs against drying and bursting. The bubbles are also drained of excess water and delivered through the suds outlet 16 to the atmosphere. Basin 9 preferably has sufficient capacity to hold water being treated for approximately 15 minutes to obtain maximum separation of water and flocs. In alternate embodiments, the basin 30 is sized to hold water being treated for about 10 minutes, 20 minutes or whatever time necessary to allow separation of the flocs and water and allow the flocs to rise to the top.

During operation, contaminated water flows through inlet conduit 1 and upward into the electrolytic cell 2. High molecular weight organic acids combine with metallic ions released from the electrodes forming highly positive insoluble hydrophobic soaps which trap organic compounds and encapsulates microbes. These highly positive compounds neutralize the negatively charged colloids permitting the colloids to coalesce, making filtration or separation possible. Floc is formed through the build-up of colloidal hydrated oxides of the separated metal ions. The floc binds, or absorbs, other impurities present in the contaminated water and serves as a transport medium to remove the impurities from water.

The solid non-conductive particles are moved at various speeds in various directions, by way of the water flow and gasses produced in the electrolytic cell, against and along the surfaces of the electrodes to insure cleaning of the electrodes. An additional electrode cleaning effect results from the return motion of those solid particles which have been carried along with water and which move past the electrodes as they settle downward.

The contaminated water is directed through the moving bed of particles in the electrolytic cell by the inlet water pressure. In some embodiments, the pressure is provided by the re-circulating pump 13. In other embodiments, air is blown into the bed to intensify its motion. In alternate embodiments, additional air is provided by supplying air into the suction side of the re-circulating pump via line 21. In a preferred embodiment, the contaminated water is generally directed through the moving bed in substantially vertically upward direction.

Water containing flocs and bubbles is led through passage 5 to basin 9 and the draining space 15. Purified water leaves via purified water outlet 12 which is preferably at a level below that of the suds layer during operation. Recirculating conduit 11 and conduit 18 leads recirculating water with flocs through pump 13 and conduit 14 to intake conduit 1. Conduit 18 recirculates the upper layer of water in the conical section of the electrolytic cell through the electrodes.

Some embodiments include valve 19 and valve 20 which may be used to control the re-circulation ratio. Soap solution and additional air is supplied to water outlet conduit 11 through line 21. Additional soluble soaps may be introduced into the water in some embodiments, particularly where the amount of high molecular weight organic acids or esters are insufficient in the contaminated water to be treated to form the electrolytically highly positive metallic soaps required for coagulation. Due to the pressure supplied by the pump 13, the air and soap added through line 21 will generally be compressed and dissolved into the water and will form very small micro-bubbles in the electrolytic cell.

Suds outlet 16 delivers drained suds 17 to the atmosphere. The drained suds contain substantially all of the impurities of the contaminated water feed. These hydrophobic flocs are easy to dry and handle. In some embodiments, flocs may be used as fertilizer after being sterilized. In alternate embodiments, the flocs are dried and may be used as fuel.

Figure 2:
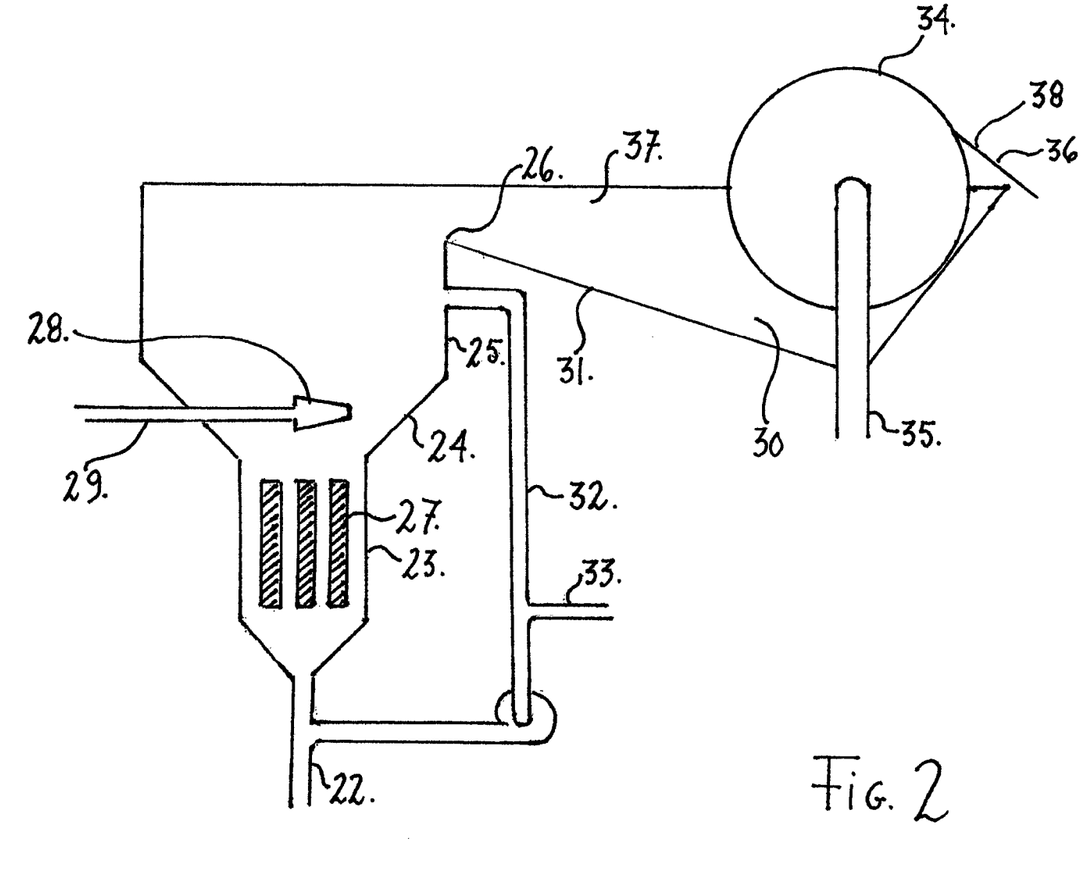
FIG. 2 shows an alternate embodiment of the apparatus and process for the purification of water in accordance with the present invention.

FIG. 2 shows an alternate embodiment of a water purification system. An inlet conduit 22 is connected to the bottom of an electrolytic cell 23. At the top of the electrolytic cell 23 is an upper section 24 having a outlet passage 26. The upper section 24 preferably includes a conical section connected to the top of the electrolytic cell 23 and a recirculating conduit 32. The outlet passage 26 is located above the conical section. Between the outlet passage 26 and the conical section, the recirculating conduit 32 exits the upper section 24. Recirculating conduit 32 includes line 33 and is fed to the inlet of a re-circulating pump 39. Air and additional soap may be introduced through recirculating conduit 32 into the system. The upper section 24 is preferably closed to the atmosphere.

Electrodes 27 are mounted in cell 23 in any suitable way (not shown in the drawing) and connected in series to a direct current source which is changed in polarity continuously. The change in polarity of the current insures the equal corrosion of the end electrodes which are connected in series to the current source but enhances the cleaning action of the fluid bed. The frequency of change in polarity is preferably done at equal periods of time. In some embodiments, continuously, as referred to herein, refers to changing the polarity between about 1 change per 1 second to about 1 change per 10 minutes and is dependent upon the amount of contaminants in the water and the tendency of the contaminants to accumulate on the electrodes.

In some embodiments, the electrodes 27 are preferably corrodible and made of, but not limited to divalent or trivalent metals, such as, aluminum, iron, magnesium or their combination or alloys. The electrodes are connected in series to a direct current source whose polarity is changed during short, preferably, equal periods of time. The electrodes 27 are surrounded by a moving bed of solid non-conductive hard particles whose specific density is greater than that of the contaminated water.

In some embodiments of the invention, located at the top of the conical part of the upper section 24, above the point where the solid particles have settled, is an air sparger 28. The air sparger 28 supplies additional bubbles besides those formed during electrolysis to the upper section 24. The air sparger 28 may be connected to a compressed air supply 29. The compressed air produces bubbles to float the flocs produced by the release of metallic soaps during the electrolysis of the water to be purified. In some embodiments, the air bubbles are introduced after the electrolytic cell.

Although a conical section is shown, any cross-section may be used and preferably a cross-section which will decrease the upward moving velocity of the water to a value where the solid particles will settle down into the electrolytic cell is used. The solid particles free falling velocity in water should be higher than the upward moving velocity of the water. The flow through the flocculation basin should preferably be maintained to allow any solid particles which are carried away from the bed to return to the electrolysis chamber.

Outlet passage 26 is connected to basin 30. Basin 30 also includes a draining space 37 that may have an inclined bottom. Opposite the outlet passage 26 is a filter 34. In a preferred embodiment, the filter 34 is a rotating vacuum filter. In alternate embodiments, the filter may be filter press, a conveyor belt vacuum filter, a sand filter, a centrifuge filter, or any filter known to one skilled in the art. Basin 30 preferably has sufficient capacity to hold water being treated for approximately 15 minutes to allow flocks to grow before filtering. In alternate embodiments, the basin 30 is sized to hold water being treated for about 10 minutes, 20 minutes or whatever time necessary to allow flocks to grow before filtering.

Both upper section 24 and basin 30 are preferably closed to the atmosphere. In practice, it has been found that exposure to the atmosphere dries out and bursts the bubbles and the flocs tend to settle, making it difficult to obtain a pure water free of flocs. The closed environment protects the bubbles carrying the flocs against drying and bursting. The bubbles are delivered to the filter 34.

During operation, contaminated water flows upwardly through inlet conduit 22 into electrolytic cell 23 and through the upper section 24. Passage 26 delivers water and suds to basin 30. After being filtered through filter 34, filtered water is delivered through central pipe outlet 35 via vacuum pump (not shown) to atmospheric pressure. Filtered solids 36 are scraped from rotating filter 34 by scraper 38. In some embodiments, the filtered water is passed through a chlorinator. In some embodiments, the filtered solids may be sterilized and used as fertilizer or dried and used as fuel.

After contaminated water has been treated to remove colloids, soluble nitrogen compounds may be reacted with chlorine. In one embodiment of the invention, chloride ions are introduced into a cathode compartment and transferred to an anode compartment by electro-dialysis.

Figure 3:
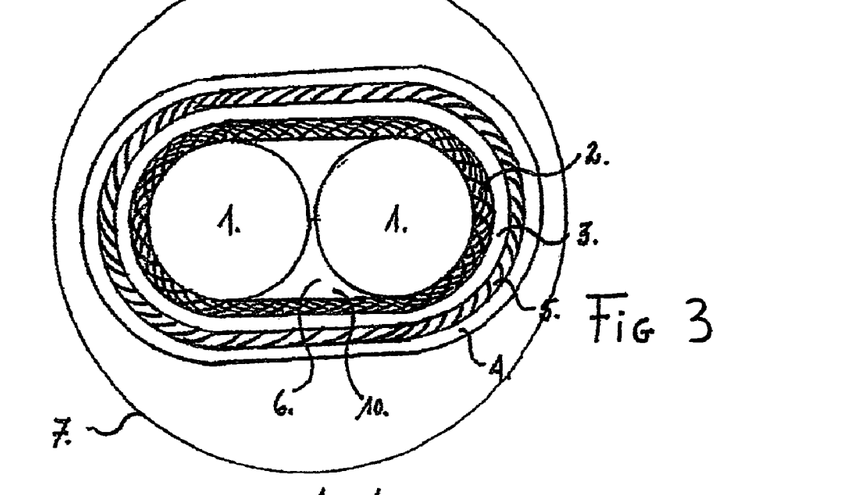
FIG. 3 shows a horizontal cross section of an embodiment of an electrolytic cell.
Figure 4:
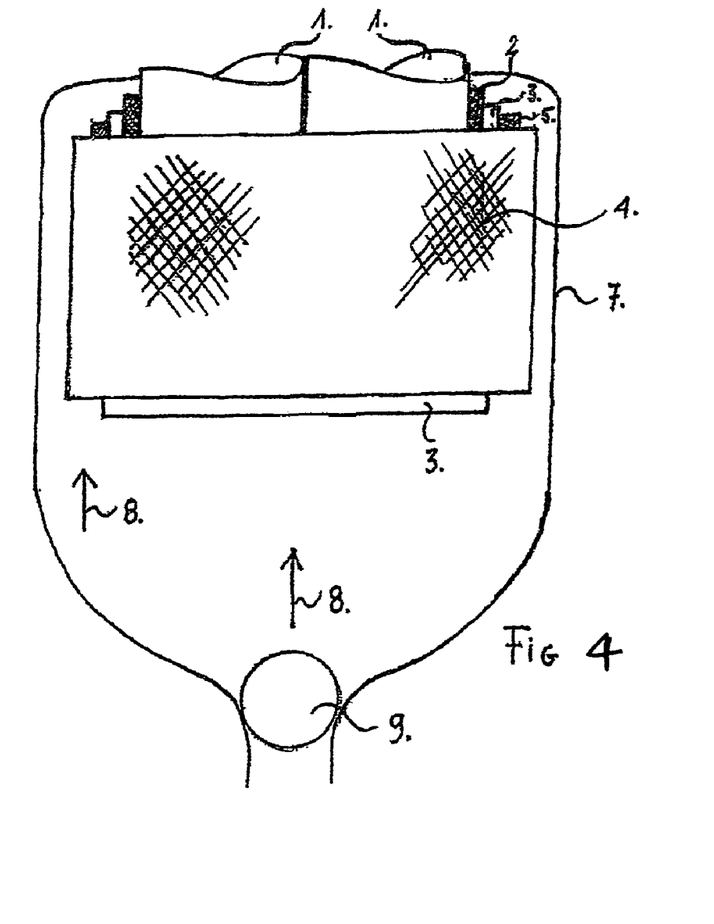
FIG. 4 shows a vertical cross section of the embodiment of FIG. 3.

FIG. 3 shows a horizontal cross section of one arrangement of an electrolytic cell of the invention. FIG. 4 shows a vertical cross section of cell arrangement of FIG. 3.

Electrodes (anodes) 1 are surrounded by a non-conductive separator 2 which is further surrounded by a porous diaphragm 3 which is further surrounded by a metal cathode 4. In a preferred embodiment, the electrodes are solid carbon. In alternate embodiments, the electrodes may be platinum, titanium covered with platinum or with ruthenium oxide. The non-conductive separator surrounds the electrodes 1 but provides sufficient free space 6 within the anode compartment to accumulate at least the necessary amount of hydrochloric acid to react with the calcareous deposits on the cathode. The non-conductive separator 2 is preferably a plastic grid. In alternate embodiments, the non-conductive separator 2 is glass. The non-conductive separator 2 is preferably thin. In some embodiments, the non-conductive separator is about 0.5 millimeters thick. The porous diaphragm 3 may be made of, but is not limited to, porous porcelain, porous PVC, poly-propylene felt, close-woven filter cloth and others. The porous diaphragm 3 preferably includes a non-permeable bottom and a permeable top. The non-conductive separator 2 preferably enhances the free flow of gases between the permeable diaphragm 3 and the electrodes 1. The permeable diaphragm 3 is preferably a porous membrane which allows free laminar flow of solutions between the anode and cathode compartments, but close-woven or tight enough to prevent turbulent flow. In some embodiments, the cathode is made of stainless steel.

An outer surrounding pipe 7 encircles the cathode and conducts water 8 to be chlorinated in a substantially vertical upward flow. A valve 9 may be provided in the inlet line to prevent the backflow of fluids. Although a valve is shown, any valve or other mechanism that prevents the backflow of water may be used. In some embodiments, a check valve is used.

During the chlorination process, electricity and water may be simultaneously shut off to allow the accumulated hydrochloric acid in free space 6 and diffuse out through diaphragm 3 to react and dissolve any calcareous deposits on cathode 4.

Figure 5:
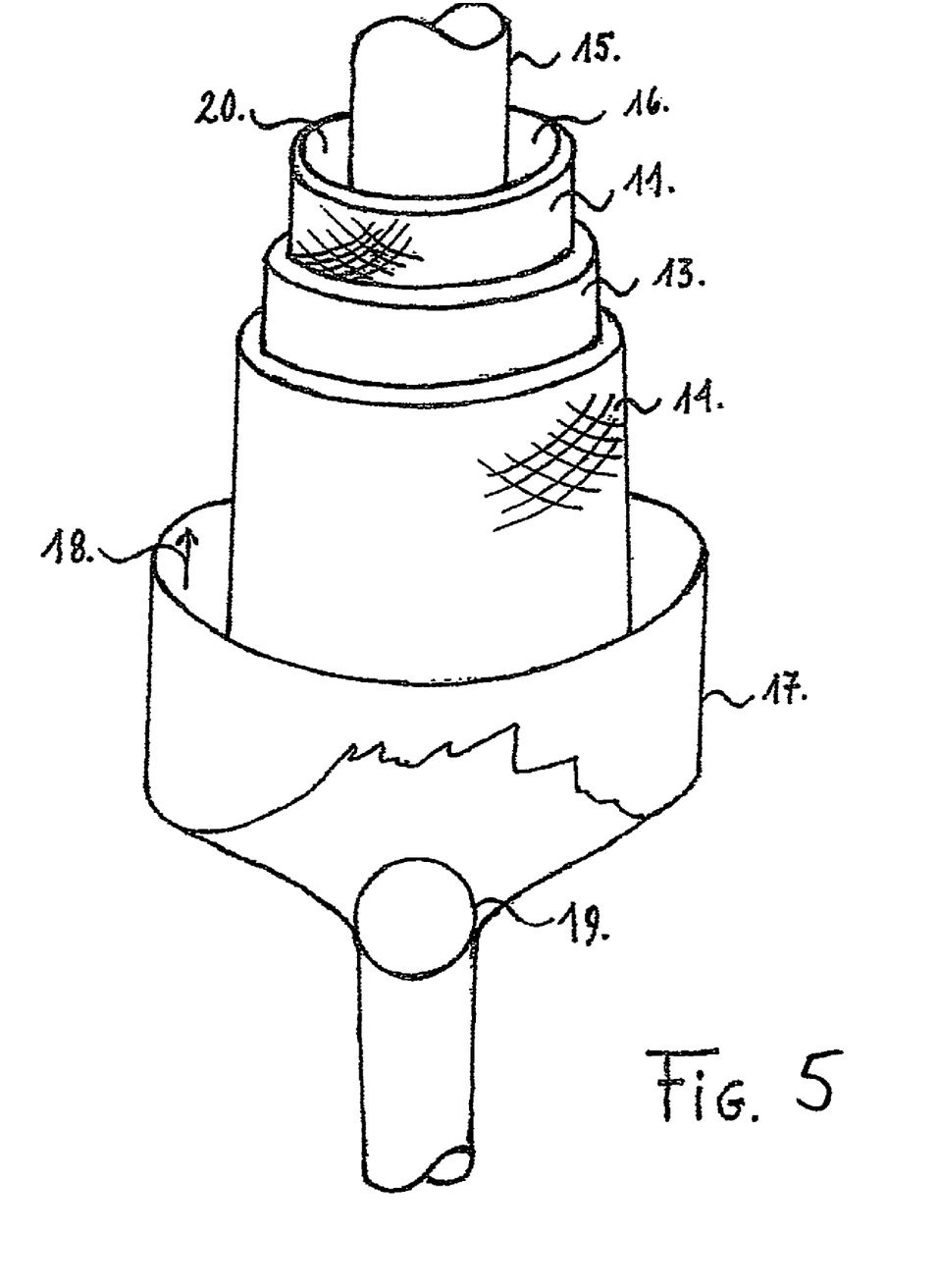
FIG. 5 shows a horizontal cross section of an alternate embodiment of an electrolytic cell.

FIG. 5 shows another embodiment of the invention having an anode 11 surrounded by porous diaphragm 13 which is further surrounded by a metal cathode 14. In a preferred embodiment, the anode 11 is made of expanded titanium covered with platinum or covered with ruthenium oxide or other non-corrodible elements. In alternate embodiments, the anode 11 may be made of graphite or other rust-proof alloy. The porous diaphragm 13 may be made of, but not limited to, porous porcelain, porous PVC, poly-propylene felt, close-woven filter cloth and others. The porous diaphragm 13 preferably includes a non-permeable bottom and an open top. The permeable diaphragm 13 is preferably a porous membrane which allows free laminar flow of solutions between the anode and cathode compartments, but close-woven or tight enough to prevent turbulent flow.

The distance between the anode 11 and the diameter of inner centered rod 15 provides sufficient free space 16 within the anode compartment to accumulate at least the necessary amount of hydrochloric acid to react with the calcareous deposits on the cathode.

Outer surrounding pipe 17 encircles the cathode and conducts water 18 to be chlorinated, in a substantially vertical upward flow. A valve 19 is provided in the inlet line to prevent the backflow of fluids. Although a valve is shown, any valve or mechanism that prevents the backflow of water may be used.

During the chlorination process, electricity and water are simultaneously shut off to allow hydrochloric acid to accumulate in free space 16 and diffuse out through diaphragm 13 to react and dissolve any calcareous deposits on cathode 14.

Not shown in FIGS. 3, 4 and 5 are the electrical connections to the anode or to the cathode which are respectively connected to the positive and to the negative pole of a direct current supply.

An example of the cell arrangement as shown in FIG. 3, has carbon electrodes measuring 1 inch in diameter by 10 inches in length, operating with water containing 40 parts per million of chlorides, will start producing chlorine in less than one minute. This is the time it takes for the chloride concentration to reach the level where chlorine is produced.

There are many other configurations possible, for instance flat expanded metal electrodes may be used with the free space required for the hydrochloric acid being formed behind the anode.

Figure 6:
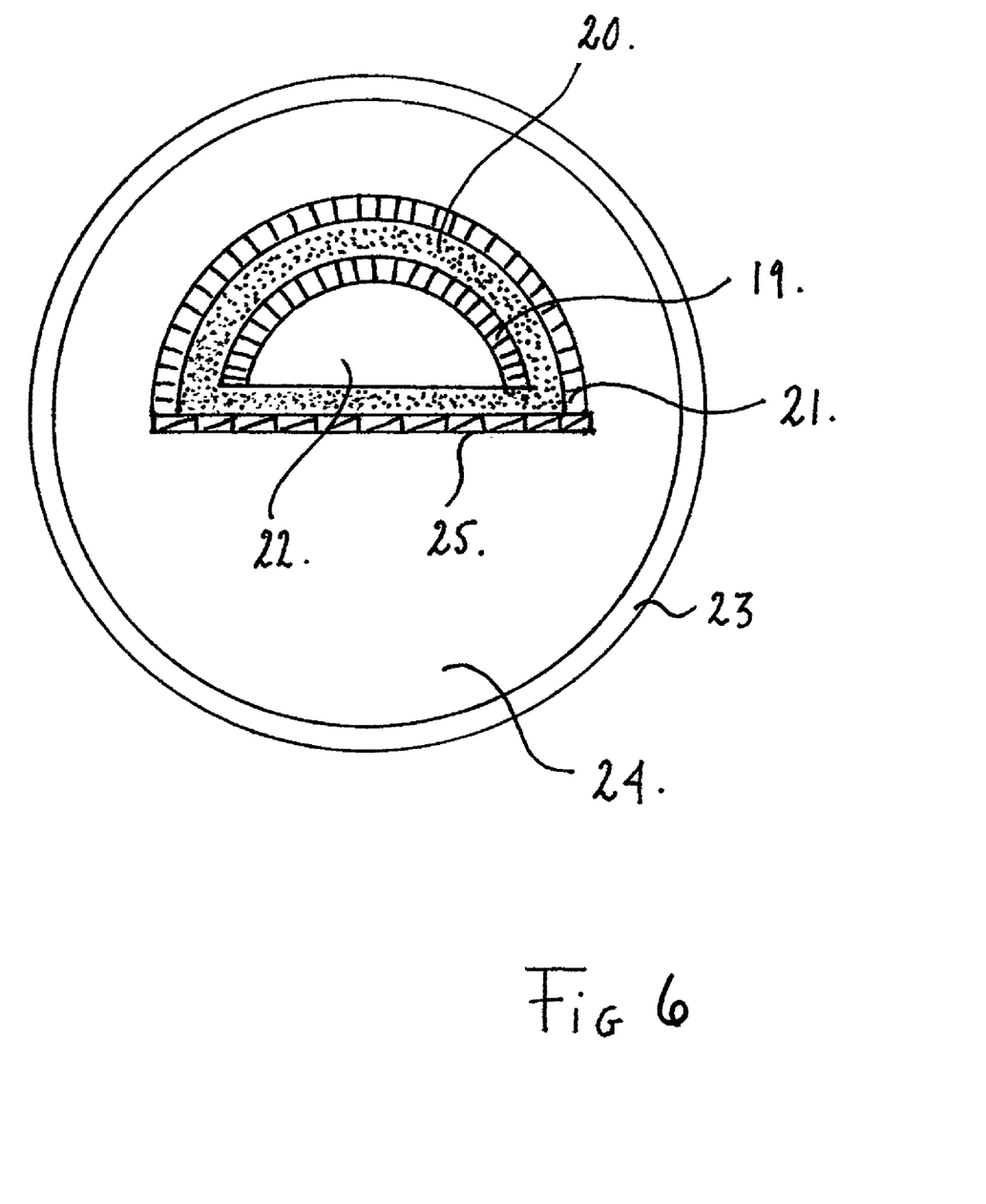
FIG. 6 shows a vertical cross section of the embodiment of FIG. 5.

FIG. 6 shows another embodiment of the invention where an anode 19 is bent and surrounded with a diaphragm 20 to provide free space 22. Also shown is a bent cathode 21 surrounding anode 19. An impermeable wall 25 holds diaphragm 20 in place preventing diffusion through the flat portion of the diaphragm 20 facing the anode 19. Outer surrounding pipe 23 conducts water 24 in a substantially vertical upward flow. The anode 19, cathode 21, and diaphragm 20 are as described for FIG. 3 or 5.

Embodiments of the chlorinator of the invention may be used in a wide variety of applications, including for example, in combination with the systems shown in FIGS. 1 and 2. However, embodiments of the chlorinator may be used apart from the systems shown in FIGS. 1 and 2, including for example, in swimming pools or to purify any aqueous stream containing soluble contaminants, such as urea and/or microbes.

The present invention and the embodiment(s) disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever forms it may be utilized.

What is claimed is:

1. An apparatus for the purification of contaminated water, comprising,
    (a) an electrolytic cell having a top end and a bottom end and comprising electrodes connected in series,
    (b) an inlet conduit connected to said bottom end of said electrolytic cell,
    (c) a closed upper section at said top end of said electrolytic cell, said upper section having an upper end and an outlet passage located at said upper end, and a sparger located above said electrodes and below said outlet passage, and a recirculating conduit located below said outlet passage,
    (d) a closed draining space in fluid communication with said outlet passage further comprising means for separating water and impurities, and
    (e) a re-circulating pump connecting said recirculating conduit to said inlet conduit.

2. The apparatus of claim 1, wherein said means for separating water from impurities comprises an inclined bottom basin sloping away from the upper section further comprising,
    (i) a purified water outlet at a lower end of the inclined bottom opposite the upper section;
    (ii) a recirculating outlet located above the purified water outlet and connected to said re-circulating pump; and
    (iii) an exit port located above the recirculating outlet for removing impurities.

3. The apparatus of claim 1, wherein the means for separating water from impurities comprises an inclined bottom basin sloping away from the upper section and further comprising a filter.

4. The apparatus of claim 3, wherein the filter comprises a rotary vacuum filter, a filter press, conveyor belt vacuum filter, a sand filter or a centrifuge filter.

5. The apparatus of claim 1, wherein the upper section is conical or partially conical in cross section.

6. The apparatus of claim 1, wherein the electrodes comprise iron, magnesium, aluminum and their alloys.

7. The apparatus of claim 1, wherein the polarity of the electrodes are alternated continuously.

8. The apparatus of claim 7, wherein the frequency of alternating the polarity of the electrodes is between 1 per 1 second to 1 per 10 minutes.

9. The apparatus of claim 1, further comprising a chlorinator.

10. The apparatus of claim 9, wherein the chlorinator comprises,
    (a) an electrolytic cell comprising,
        (i) one or more anodes and a porous diaphragm surrounding the anodes to form an anode compartment, wherein said porous diaphragm has a non-permeable bottom;
        (ii) a cathode surrounding the porous diaphragm; and
        (iii) means for directing the flow of fluids towards the anode,
wherein the porous diaphragm is permeable enough to allow laminar flow, but tight enough to prevent turbulent flow, such that chloride ions concentrate in the anode compartment via electrodialysis when power is on, thus forming hydrochloric acid, and said hydrochloric acid diffuses through the porous diaphragm to the cathode when power and water flow are both off, and thus cleans said cathode.

11. A water purification process comprising:
    (a) passing contaminated water in a generally vertically upward direction through an electrolytic cell to form a hydrophobic floc comprising purified water, water, impurities and suds, said electrolytic cell having a plurality of electrodes connected in series, wherein the polarity of said electrodes is alternated continuously, and wherein said electrodes are surrounded by a moving bed of solid, non-conductive particles;
    (b) sparging said hydrophobic floc at a point above said electrodes to cause said hydrophobic floc to float;
    (c) directing said floating hydrophobic floc to a closed chamber directly connected adjacent to an uppermost end of the electrolysis chamber and above said sparging point;
    (d) separating the impurities, suds and water from the purified water;
    (e) removing the impurities and suds from the closed chamber; and
    (f) removing the purified water from the closed chamber; and
    (g) recirculating a portion of the water from the closed chamber to the electrolytic cell.

12. The water purification process of claim 11, wherein the upward velocity of the water is partially accomplished by re-circulation of the water through the cell.

13. The water purification process of claim 11, wherein the non-conductive particles have a specific density greater than that of the contaminated water.

14. The water purification process of claim 11, wherein the free falling velocity of the non-conductive particles is greater than the upward velocity of the water.

15. The water purification process of claim 11, wherein the purified water is further chlorinated.

16. The water purification process of claim 11, the polarity of the electrodes being alternated when applying a direct current voltage.

17. The water purification process of claim 11, wherein the contaminated water is directed through the moving bed by pressure.

18. The water purification process of claim 11, wherein the solid non-conductive particles are granite particles.

19. The water purification process of claim 11, wherein the contaminated water is directed through the moving bed by pressure.

20. The water purification process of claim 11, wherein a soap solution is added to the contaminated water.

21. The water purification process of claim 11, wherein the water is further chlorinated with an electrolytic chlorinator having an anode compartment surrounded by a porous membrane, and the power and water flow are occasionally turned off, allowing HCL formed in the anode compartment to diffuse out and clean a cathode.

22. The water purification process of claim 11, wherein the purified water is further chlorinated with an electrolytic chlorinator having an anode surrounded by a porous membrane to form an anode compartment, and a cathode outside of said anode compartment.

23. The water purification process of claim 22, wherein the power and water flow are occasionally turned off, allowing HCL formed in said anode compartment to diffuse out and clean said cathode.

* * * * *